Figure 1:
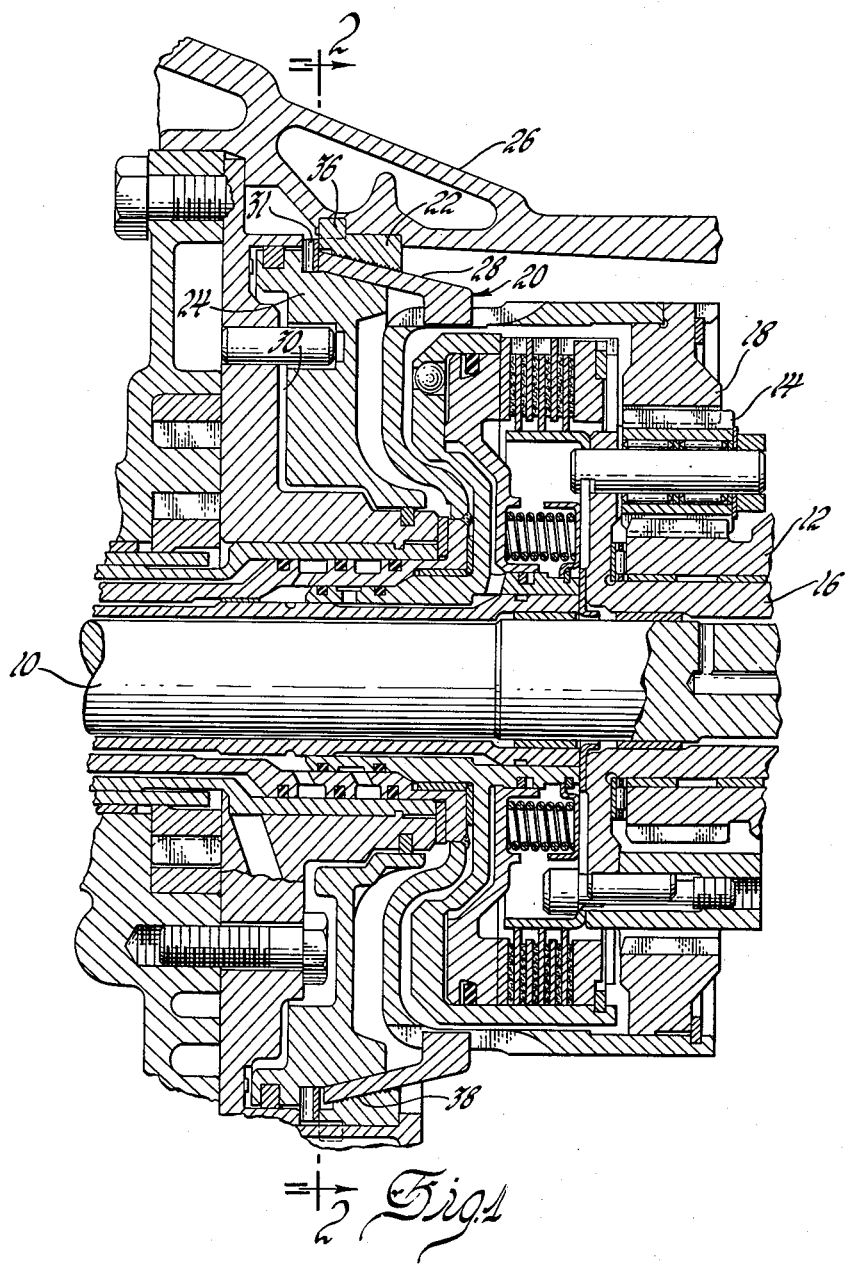

Dec. 20, 1960     F. J. WINCHELL     2,965,205
TRANSMISSION

Filed Sept. 23, 1957     3 Sheets-Sheet 1

INVENTOR.
BY Frank J. Winchell
T. R. Chisholm
ATTORNEY.

Dec. 20, 1960 F. J. WINCHELL 2,965,205
TRANSMISSION
Filed Sept. 23, 1957 3 Sheets-Sheet 2

INVENTOR.
Frank J. Winchell
BY
T. L. Chisholm
ATTORNEY.

Dec. 20, 1960 F. J. WINCHELL 2,965,205
TRANSMISSION
Filed Sept. 23, 1957 3 Sheets-Sheet 3

INVENTOR.
Frank J. Winchell
BY T. L. Chisholm
ATTORNEY.

United States Patent Office 2,965,205
Patented Dec. 20, 1960

2,965,205

TRANSMISSION

Frank J. Winchell, Bloomfield Hills, Mich., assignor to General Motors Corporation, Detroit, Mich., a corporation of Delaware Filed Sept. 23, 1957, Ser. No. 685,460

13 Claims. (Cl. 192—66)

This invention relates to clutches or brakes, particularly, but not exclusively for establishing or sustaining torque in automatic transmissions for automobiles. It is directed to providing an improved clutch or brake of high torque capacity, high rate of heat rejection and high wear resistance which can be disposed in the small space available in modern automatic transmissions for motor vehicles.

The invention is particularly suited to transmissions of the type disclosed in the application for U.S. patent S.N. 600,022 filed jointly by me and Oliver K. Kelley on July 25, 1956, the disclosure of which is incorporated herein by reference. However, this is an illustration only, and the invention is not limited to such transmissions.

In transmissions of the character illustrated in said application it has been usual to have clutches and/or brakes in which friction devices establish and sustain torque between relatively rotatable members in order to establish power trains at various speed ratios through the transmission. Such clutches or brakes may be broadly termed friction torque-establishing devices. The friction torque-establishing device may connect two relatively rotatable members so that they rotate together, and one drives the other, in which case the friction torque-establishing device is sometimes narrowly termed a clutch. Also, the friction torque-establishing device may connect together two relatively rotatable members one of which is fixed, so that one member holds the other fast, in which case the friction torque-establishing device is sometimes narrowly termed a brake. An example of the latter is a device which holds a reaction gear of a planetary gearset to sustain reaction torque so as to drive the carrier and thus establish a power train.

It is immaterial to this invention whether so-called clutches or so-called brakes are used, and in fact for the purposes of the invention clutches and brakes cannot be distinguished from each other. Therefore, for brevity and for example, I use the term clutch herein, and when I do, it is to be understood that the term does not exclude a brake as above narrowly defined. In any case the clutch or brake connects together two members which, before connection, are rotatable relative to each other, and which after connection must rotate at the same speed which speed may be zero. Sometimes this necessarily results in slipping or sliding engagement of the friction surfaces. This slipping engagement at high relative speeds of the two members and at high pressure to establish high values of torque in a compact device which must be located in a limited space presents serious problems. In fact it has been found impossible to transmit the torque of present day high torque engines or sustain reaction torque by means of previously known clutches or brakes which can be physically placed in existing automatic transmissions for such engines. The problems have been particularly difficult with cone clutches or brakes, that is, those in which the engaging friction surfaces are frusto-conical, but the invention is also applicable to other forms of clutch and brake, including flat disks and cylindrical bands. It has proved difficult or impossible to cool or lubricate adequately small clutch members of sizes used in many automatic transmissions.

Attempts have been made to use various materials for the two engaging surfaces, and attempts have been made to groove or channel the surfaces in various ways to circulate coolant or lubricant. However, none of the devices which I know about, which can be placed in the space available in existing transmissions has been capable of sustaining or transmitting the full torque of a present day high torque engine and still remain operative for any practical length of time. Frequent causes of failure are sticking or welding together of the engaging friction elements or surfaces, due to heat and high pressure, and destruction or severe damage to the surfaces due to slipping over each other, which last cause of failure is frequently associated with inadequate lubrication or cooling.

I have discovered that by grooving or channelling one of the members in a new way, by making the width of the grooves in the direction of relative motion of the parts relatively large with relation to the width of the friction surfaces between the grooves, and especially by making the area included by the total friction surfaces but occupied by the cooling channels greater than the area occupied by the sum of the individual friction surfaces, and by making one member of work-hardenable metal and by working the surfaces of this member in a new way the torque capacity and durability of the clutch are importantly increased.

The reasons for these results are obscure.

Based on this discovery, it is an object of my invention to provide a small, light-weight clutch of improved torque capacity, improved heat-rejecting ability and improved durability.

Figure 2:
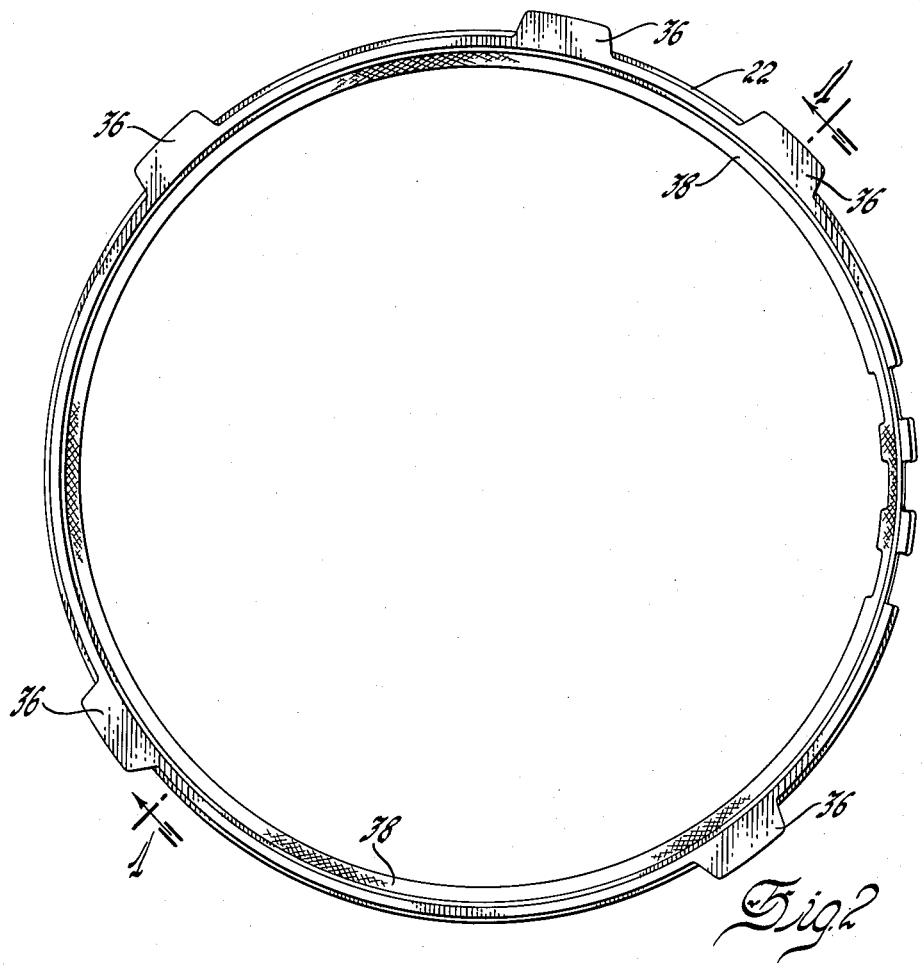
Figure 3:
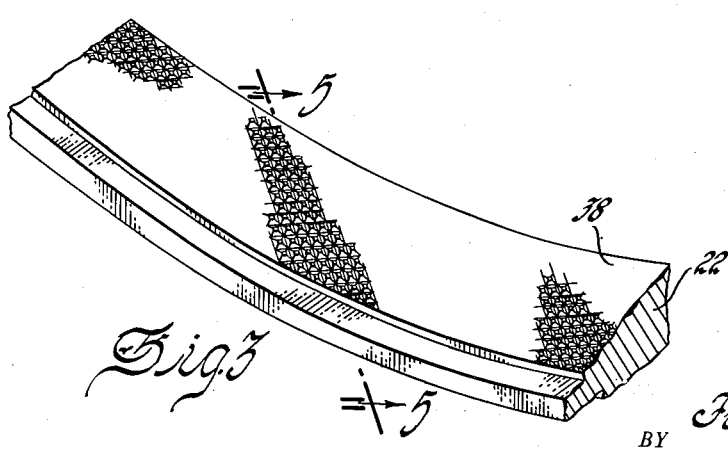
Figure 4:
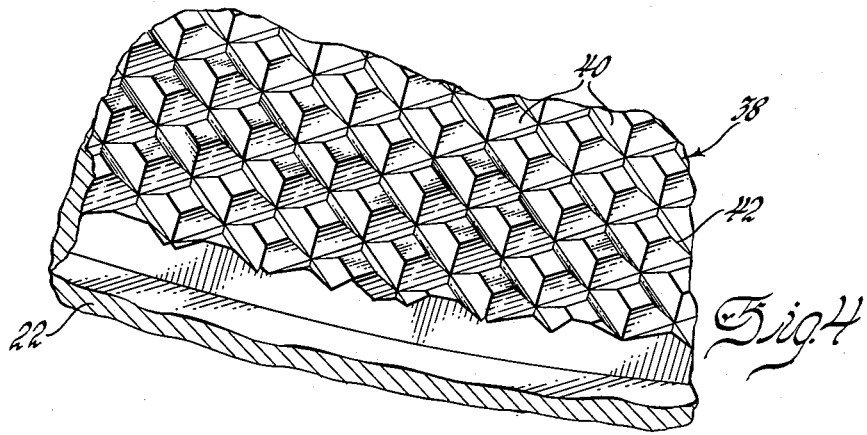
Figure 5:
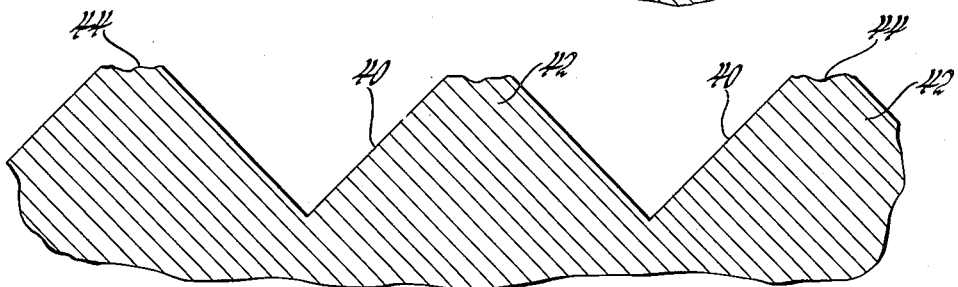
Figure 6:
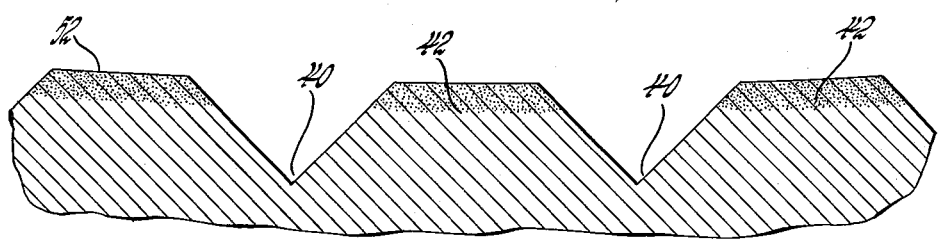
Figure 7:
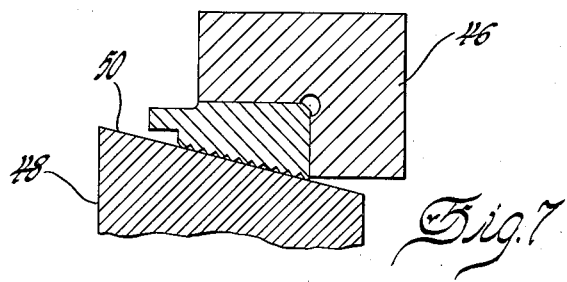

In the drawings:

Fig. 1 is a cross section of a portion of a transmission having a clutch embodying the invention, the clutch being shown as a section on the line 1—1 of Fig. 2, Fig. 2 is an elevation of the clutch element shown in Fig. 1, Fig. 3 is a perspective view of a portion of the engaging or friction face of the clutch shown in Fig. 1, Fig. 4 is an enlarged view of a portion of Fig 3, Fig. 5 is a magnified section on the plane represented by 5—5 in Fig. 3 showing the clutch in an intermediate stage of manufacture, Fig. 6 is an enlarged section corresponding to Fig. 5 showing the clutch after the final manufacturing step, and Fig. 7 is one-half of a symmetrical section of the clutch corresponding to the section in Fig. 1 showing another intermediate step in the process of manufacture.

Fig. 1 shows a portion of the transmission more fully disclosed in the application, S.N. 600,022 referred to above. In this transmission an input shaft 10 drive (by a connection as shown in S.N. 600,022) a sun gear 12 which meshes with a planet gear 14 mounted on a carrier 16 which drives any suitable transmission output shaft. The planet gear meshes with a reaction ring gear 18 which may be held by a clutch or brake generally denoted by 20 to establish reaction in the planetary gear set to drive the output shaft, as is known. The clutch 20 includes a frusto-conical ring 22 and a frusto-conical piston 24 both non-rotatively secured to the stationary casing 26 and an intermediate frusto-conical ring 28 splined to the ring gear 18. The ring 28 is smooth and is preferably made of steel. The piston 24 may be urged to the right as Fig. 1 is seen by pressure in a chamber 30 against the force of a return spring 31 to grip the clutch member 28 between the face of the piston 24 and the clutch member 22 to hold the ring gear 18. As so far described the structure is known.

The ring 22 is preferably constructed, as shown in detail in Figs. 2–5. It has a number of lugs 36 on its outside surface by which the ring is held against rotation in the casing 26. The inner generally frusto-conical surface of the ring is formed with frusto-pyramidal projections as shown in Figs. 3, 4 and 6.

The material for the ring 22 is preferably aluminum, a work-hardenable metal such as bronze, or an aluminum alloy but some of the advantages of the invention can be realized by using other materials. I have found that an alloy containing about 89% or more aluminum with from about 2% to about 3% silicon, from about 4% to about 5% copper, and about 1.2% iron is suitable, and gives a ring of superior torque capacity, resistance to wear and heat conductivity, which latter characteristic promotes heat rejection through the grooves to be described. I prefer to use an alloy containing the ingredients named, in the proportions stated, but the alloy may also contain traces of other elements, such as manganese about 0.35%, magnesium 0.05%, zinc 0.50%, titanium 0.25% and nickel 0.35%. I prefer to form the blank from which the ring 22 is made by casting. Die castings are preferred from the point of view of simplicity and economy of production, and give results which are acceptable for many uses. However, for highest torque capacity, wear resistance and heat rejection I prefer sand castings. For some reason, which I do not understand, sand castings are superior to die castings in these respects.

After the blank has been machined, the inner frusto-conical surface 38 is first knurled by any suitably known knurling roll to form diagonally intersecting grooves 40 which divide the surface into lands or islands 42 which are of frusto-pyramidal form. When a suitable work-hardenable material is used, the knurling process hardens the lands. After knurling the lands 42 are relatively high and have roughened and irregular surfaces as shown at 44 in Fig. 5. After the knurling operation the ring is placed in a supporting die 46, as shown in Fig. 7, and a coining punch 48 having a frusto-conical surface 50 is pressed into the ring. The surface 50 preferably conforms as nearly as possible to the size and slope of the outer surface of the steel ring 28 with which the ring 22 is to engage. However, it is sometimes desirable to have the angle of the cone of the male ring slightly greater than the angle of the female ring to accommodate expansion or stretching of the female ring as the rings are engaged. Pressing of the punch 48 into the ring 22 coins the lands so that the metal of which the lands are formed is further worked and compacted beneath the conical surface determined by the lands, as indicated by the shaded areas in Fig. 6. The metal takes the form shown in Fig. 6, in which the lands 42 and grooves 40 are somewhat lower and shallower than in Fig. 5 and the lands are provided with new surfaces 52 which are larger than the surfaces 44. Each surface 52 is a portion of a cone whose angle may be the same as the angle of the punch 48 and the surfaces 52 all lie in the same cone which is determined by the punch 48. This conical surface precisely conforms to the surface of the ring 28 when the clutch is engaged.

The compacting of the metal beneath the friction surfaces 52 appears to increase the resistance of the clutch element to wear, which I believe is due to further working and hardening of the metal.

The grooves 40 preferably have sides sloping at 90° to each other as shown in Figs. 5 and 6 and the sizes and frequency of the surfaces 52 are so selected that more than half of the area of the friction surface 38 is occupied by grooves and less than half of the friction surface 38 or less is composed of the surfaces 52 of the lands 42.

The piston 24 may be a counterpart of the ring 22, formed in the same way of the same material. After casting the piston and machining the friction surface, the friction surface may be knurled as described in connection with the ring 22 and the surface of the piston may be coined in the same manner by pressing over the piston a coining die having a female frusto-conical surface corresponding precisely to the inside of the steel ring 28.

When the clutches embodying this invention are used in automatic transmissions, oil is constantly circulated through the transmission by constantly operating pumps, as is known. This continuously bathes the clutch surfaces in a mist of oil.

The grooves 40 form passages through which this oil is circulated to lubricate and cool the clutch. The grooves form passages of relatively large cross section which are adjacent and surround relatively small masses of metal forming the pyramids 42 supporting the surfaces 52, and in turn the mass of metal in each pyramid 42 is relatively large compared with the area of the surface 52. Therefore, the heat generated in the surface 52 has a relatively short path of relatively large cross section through metal of high thermal conductivity to a relatively large body of oil circulating in the grooves.

The grooves are all diagonally placed with reference to the direction of relative motion between the ring 22 or piston 24 and the ring 28. Therefore, the direction of relative motion between the clutch surfaces is along the diagonals of the surfaces 52. In one embodiment of the invention for example as illustrated in Fig. 4, the length of this diagonal is about half of the distance between lands in the direction of motion. This means that any given point on the steel clutch ring 28 travels about half as far in contact with the lands 42 as it travels over the grooves 40. This provides cooling paths for each individual point on the steel ring 28 which are relatively long, alternating with heating paths which are relatively short. I believe that many advantages of the invention will result if cooling paths are used which are no shorter than the heating paths. That is the distance between lands, in the direction of relative motion between the engaging surfaces, is at least as great as the length of a land measured in the same direction. Also, the grooves are all open at their ends to freely receive and discharge oil at the edges of the rings. These conditions provide for rapid and effective heat rejection.

The importance of this can be appreciated by considering the actual size and torque capacity of the clutch elements to which the invention is applied. The ring 22 may have a lesser internal diameter of less than seven inches; it may have a maximum thickness of about a quarter of an inch and a maximum width along the conical elements of its friction surface of about ⅝ of an inch. These sizes are dictated by the physical space available in the transmission, which in turn is determined by the size of the vehicle. The ring 22 and the piston 24 may be urged together with a force of 4400 pounds derived from a piston area in the chamber 30 of 22 square inches and an oil pressure of 200 pounds per square inch. The clutch 20 may have to sustain a torque of 1400 pound-feet derived from an engine delivering 350 pound-feet multiplied by a transmission ratio of about 4. These are severe requirements, and I have found that they are adequately met by clutches or brakes of small size when made according to the invention.

I claim:

1. A cone friction torque-establishing device comprising in combination a first frusto-conical member formed of steel and having concentric smooth male and female frusto-conical friction surfaces, a second frusto-conical member adapted to engage said male surface, said second member being sand cast of aluminum alloy containing at least substantially 89% aluminum and having a large number of frusto-pyramidal lands separated by grooves disposed diagonally to the axis of revolution of the second frusto-conical member, the top surface of each land being conical and the top surfaces of all the lands being disposed in the surface of a cone having the same angle as that of the male surface of the first brake or clutch member, the material of the second member being compacted after formation of the grooves, and the total of the areas of the conical surfaces of the lands being less than the area of the total frusto-conical surface occupied by the grooves, and a third member adapted to engage the female surface of the first member, said third member having the characteristics of the second member and having a large number of frusto-pyramidal lands separated by grooves disposed diagonally to the axis of revolution of the third frusto-conical member, the surface of each land of the third member being conical and the surfaces of all the lands of the third member being disposed in the surface of a cone having the same angle as that of the female surface of the first member.

2. A friction torque-establishing device comprising in combination a first frusto-conical member having a smooth frusto-conical friction surface, a second frusto-conical member adapted to engage said surface, said second member formed of aluminum alloy containing at least about 89% aluminum and having a large number of frusto-pyramidal lands separated by grooves disposed diagonally to the axis of revolution of the second frusto-conical member, the top surface of each land being conical and the top surfaces of all the lands being disposed in the surface of a cone having the same angle as that of the friction surface of the first member, and the total of the areas of the conical surfaces of the lands being less than the area of the total frusto-conical surface occupied by the grooves, and means for urging the first and second members into frictional contact with each other.

3. A friction torque-establishing device comprising in combination a first frusto-conical member having a smooth frusto-conical friction surface, a second frusto-conical member adapted to engage said surface, said second member formed of aluminum alloy containing at least about 89% aluminum and from about 2% to about 3% of silicon and having a large number of frusto-pyramidal lands separated by grooves disposed diagonally to the axis of revolution of the second frusto-conical member, the top surface of each land being conical and the top surfaces of all the lands being disposed in the surface of a cone having the same angle as that of the friction surface of the first member and the total of the areas of the conical surfaces of the lands being less than the area of the total frusto-conical surface occupied by the grooves and means for urging the first and second members into frictional contact with each other.

4. A friction torque-establishing device comprising in combination a first frusto-conical member having a smooth frusto-conical friction surface, a second frusto-conical member adapted to engage said surface, said second member formed of aluminum alloy containing at least about 89% aluminum, from about 2% to about 3% of silicon, from about 4% to about 5% of copper and about 1.2% of iron and having a large number of frusto-pyramidal lands separated by grooves disposed diagonally to the axis of revolution of the second frusto-conical member, the top surface of each land being conical and the top surfaces of all the lands being disposed in the surface of a cone having the same angle as that of the friction surface of the first member and the total of the areas of the conical surfaces of the lands being less than the area of the total frusto-conical surface occupied by the grooves, and means for urging the first and second members into frictional contact with each other.

5. A friction member having a friction surface adapted to engage a second friction surface on a second member for sliding engagement by relative motion between the two members, said first member being formed of an aluminum alloy containing at least about 89% aluminum and having its friction surface interrupted by intersecting grooves disposed diagonally to the direction of relative motion between the two members, said grooves having frusto-pyramidal lands whose top surfaces in total are less than the area of the grooves, and the material of the first member being compacted after formation of the grooves by forces normal to the friction surface.

6. A friction member having a friction surface adapted to engage a second friction surface on a second member for sliding engagement by relative motion between the two members, said first member being formed of an aluminum alloy containing at least about 89% aluminum and having its friction surface interrupted by intersecting grooves disposed diagonally to the direction of relative motion between the two members, said grooves being separated by frusto-pyramidal lands whose top surfaces in total are less than the area of the grooves.

7. A friction member having a friction surface adapted to engage a second friction surface on a second member for sliding engagement by relative motion between the two members, said first member being formed of an aluminum alloy containing at least about 89% aluminum and from about 2% to 3% silicon and having its friction surface interrupted by intersecting grooves disposed diagonally to the direction of relative motion between the two members, said grooves being separated by frusto-pyramidal lands whose top surfaces in total are less than the area of the grooves.

8. A friction member having a friction surface adapted to engage a second friction surface on a second member for sliding engagement by relative motion between the two members, said first member being formed of an aluminum alloy containing at least about 89% aluminum, from about 2% to 3% silicon, about 1.2% iron and from about 4% to about 5% copper, and having its friction surface interrupted by intersecting grooves disposed diagonally to the direction of relative motion between the two members, said grooves being separated by frusto-pyramidal lands whose top surfaces in total are less than the area of the grooves.

9. A friction member having a friction surface adapted to engage a second friction surface on a second member for sliding engagement by relative motion between the two members, said first member being formed of an aluminum alloy containing at least about 89% aluminum, from about 2% to about 3% silicon, from about 4% to about 5% copper, about 1.2% iron and traces of manganese, magnesium, zinc, titanium and nickel, and having its friction surface interrupted by intersecting grooves disposed diagonally to the direction of relative motion between the two members, said grooves being separated by frusto-pyramidal lands whose top surfaces in total are less than the area of the grooves.

10. A friction member having a friction surface adapted to engage a second friction surface on a second member for sliding engagement by relative motion between the two members, said first member being formed of an aluminum alloy containing at least about 89% aluminum and from about 2% to 3% silicon and having its friction surface interrupted by intersecting grooves disposed diagonally to the direction of relative motion between the two members, said grooves being separated by frusto-pyramidal lands whose top surfaces in total are less than the area of the grooves, and the material of the first clutch or brake member being compacted after formation of the grooves by forces normal to the friction surface.

11. A friction member having a friction surface adapted to engage a second friction surface on a second member for sliding engagement by relative motion between the two members, said first member being formed of an aluminum alloy containing at least about 89% aluminum, from about 2% to 3% silicon, about 1.2% iron and from about 4% to about 5% copper, and having its friction surface interrupted by intersecting grooves disposed diagonally to the direction of relative motion between the two members, said grooves being separated by frusto-pyramidal lands whose top surfaces in total are less than the area of the grooves, and the material of the first member being compacted after formation of the grooves by forces normal to the friction surface.

12. A friction member having a friction surface adapted to engage a second friction surface on a second member for sliding engagement by relative motion between the two members, said first member being formed of an aluminum alloy containing at least about 89% aluminum, from about 2% to about 3% silicon, from about 4% to about 5% copper, about 1.2% iron and traces of manganese, magnesium, zinc, titanium and nickel, and having its friction surface interrupted by intersecting grooves disposed diagonally to the direction of relative motion between the two members, said grooves being separated by frusto-pyramidal lands whose top surfaces in total are less than the area of the grooves, and the material of the first member being compacted after formation of the grooves by forces normal to the friction surface.

13. A friction member having a friction surface adapted to engage a second friction surface on a second member for sliding engagement by relative motion between the two members, said first member being formed of a work-hardenable material and having its friction surface interrupted by intersecting grooves disposed diagonally to the direction of relative motion between the two members, said grooves being separated by lands whose top surfaces in total are less than the area of the grooves, and the material of the first member being compacted after formation of the grooves by forces normal to the friction surface.

References Cited in the file of this patent

UNITED STATES PATENTS

| 1,657,265 | Ludwig | Jan. 24, 1928 |
| 2,198,028 | Farmer | Apr. 23, 1940 |
| 2,779,175 | Le Hew | Jan. 29, 1957 |

FOREIGN PATENTS

| 43,973 | Netherlands | Sept. 15, 1938 |
| 1,127,570 | France | Aug. 13, 1956 |
| 1,139,089 | France | Feb. 4, 1957 |